April 27, 1937. H. H. NIELSEN ET AL 2,078,405
VEHICLE SIGNAL SWITCH
Filed Jan. 21, 1935 2 Sheets-Sheet 2
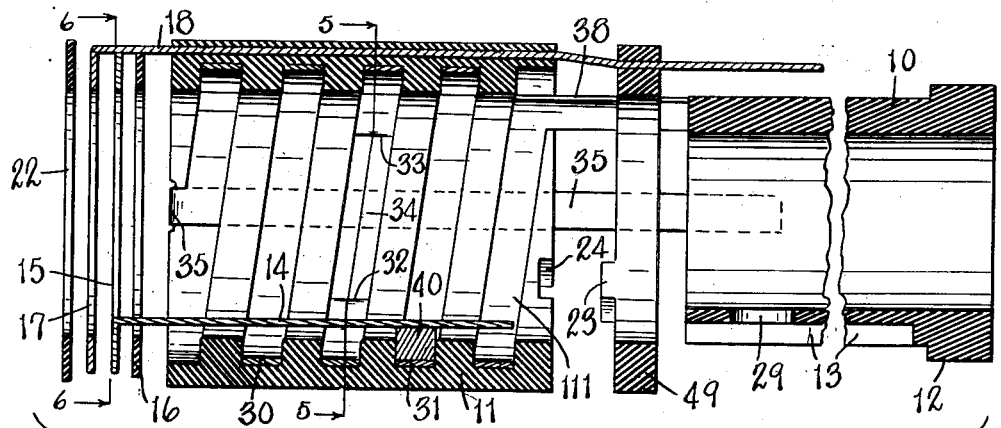
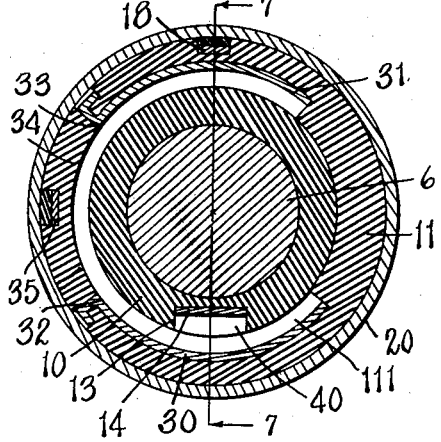
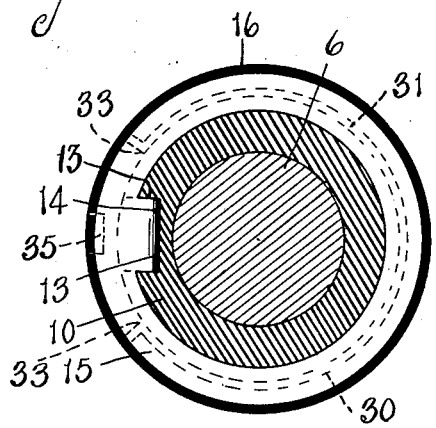
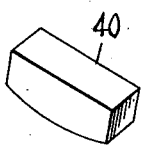
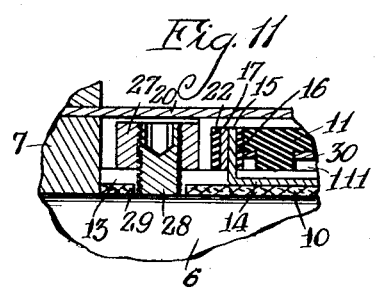
INVENTOR
Holger H. Nielsen
BY William J. Kryder
Chappell Earl
ATTORNEYS Patented Apr. 27, 1937

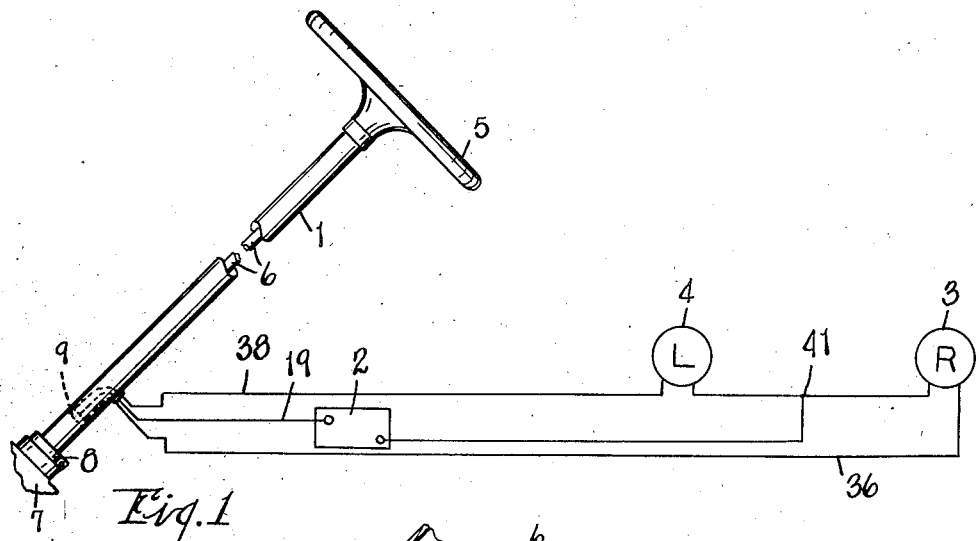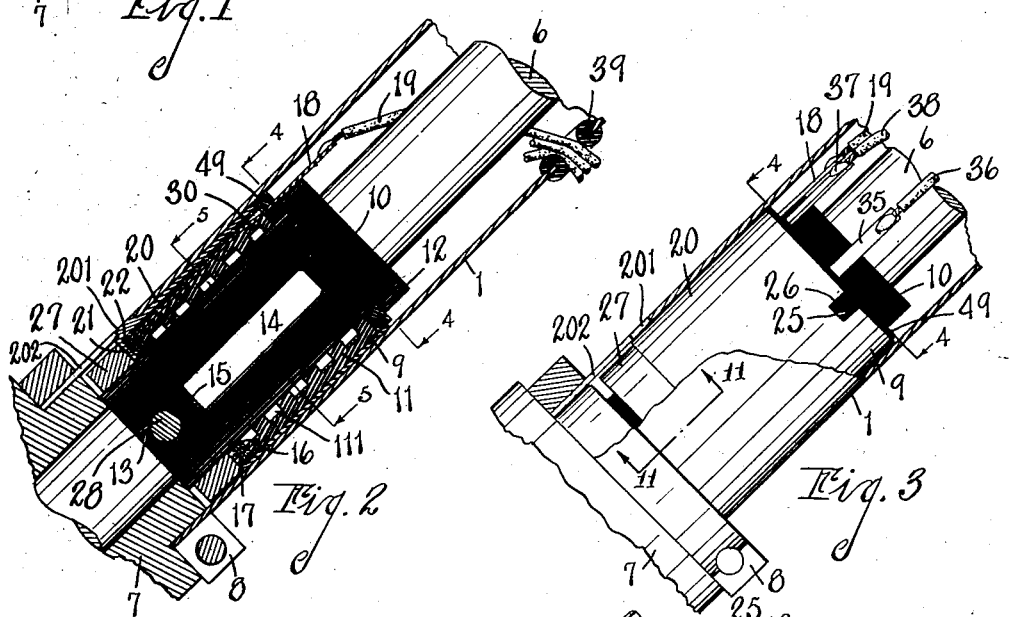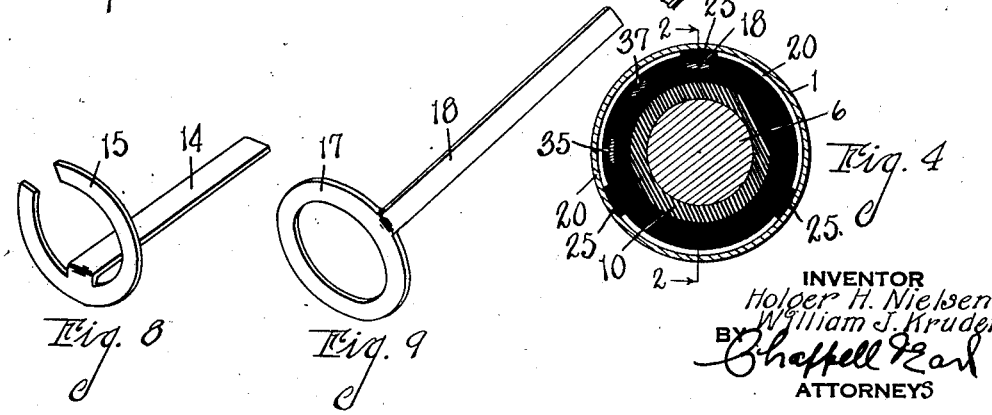

2,078,405

UNITED STATES PATENT OFFICE 2,078,405

VEHICLE SIGNAL SWITCH

Holger H. Nielsen and William J. Kruder, Chicago, Ill., assignors to Auto Turn-Lite Corporation, Chicago, Ill., a corporation of Illinois Application January 21, 1935, Serial No. 2,704

7 Claims. (Cl. 200—59)

The main objects of this invention are:

First, to provide an improved automatic switch which is especially well adapted for association with the steering column and post of an automotive vehicle for the operation of direction signals.

Second, to provide a switch of the foregoing character which is adapted to be housed and concealed within the steering column and which may be assembled therewith in a simple and expeditious manner.

Third, to provide a switch of this character which is simple and economical in its parts and entirely automatic in operation, the switch being wholly responsive to the operation of the steering post throughout the full stroke of the wheel.

Objects relating to details and economies of our invention will appear from the description to follow. The invention is defined and pointed out in the claims.

A structure which is a preferred embodiment of our invention is illustrated in the accompanying drawings, in which:

Fig. 1 is a fragmentary view partially diagrammatic and partially in side elevation of a direction signaling system embodying features of our invention.

Fig. 2 is a fragmentary view partially in longitudinal section on line 2—2 of Fig. 4.

Fig. 3 is a fragmentary view partially in side elevation and partially in section.

Fig. 4 is a transverse section taken on line 4—4 of Figs. 2 and 3.

Fig. 5 is an enlarged view in transverse section taken on a line corresponding to line 5—5 of Figs. 2 and 7.

Fig. 6 is a transverse sectional view taken on a line corresponding to line 6—6 of Fig. 7.

Fig. 7 is a fragmentary view in longitudinal section on a line corresponding to line 7—7 of Fig. 5, the parts being shown in disassembled relation.

Fig. 8 is a perspective view of the conductor strip which is associated with the steering column member.

Fig. 9 is a perspective view of another conductor strip which is associated with the strip shown in Fig. 8.

Fig. 10 is a perspective view of the brush or traveling contactor.

Fig. 11 is a sectional view on the line 11—11 of Fig. 3.

Referring to the drawings, 1 is the steering column of an automotive vehicle. 2 represents a battery and 3 and 4 right and left direction indicating signals. The arrangement of the direction signal system is such that when the steering wheel 5 is turned to a certain extent in either direction the proper signal is operated indicating the direction of the turn about to be made. The signals are preferably mounted on the vehicle at the rear thereof, although it is to be understood that similar signals may also be used at the front of the vehicle.

The steering column 1 is tubular in shape and houses the steering post 6, the latter being disposed in spaced concentric relation within the column, the steering wheel being connected to its upper end. The lower end of the steering column is connected to the bearing 7 of the post 6 by means of an annular clamp 8. Within the base of the steering column and round the steering post 6 we arrange our switch 9, the switch being adapted to be sleeved over the steering post and within the steering column as shown without altering the standard construction of such parts. With this in mind, we make our switch in the form of a cylindrical unit.

Our automatic switch preferably comprises a steering post member 10 and a steering column member 11, such members being formed of any suitable insulating material such as hard rubber or fiber. The steering post member 10 is sleeved on the steering post and is provided with an annular flange 12 at one end and an external longitudinal groove 13 opening to the other end thereof. In the longitudinal groove 13 we seat a longitudinal strip 14 of conducting material, the strip having an end ring 15 embracing the steering post member 10 and being spaced from the end of the steering column member 11 by a washer 16 of insulating material.

The ring 15 is in constant contact with an adjacent ring 17 of conducting material, the latter being connected to a longitudinal conducting strip 18 extending through the wall of the member 11 and an end ring 49 of insulating material, the outer end of the conducting strip 18 being connected to one terminal of the battery 2 by the conductor 19. Thus, regardless of the rotation of the member 10, the conducting strip 14 in the groove 13 is always in electrical communication with one terminal of the battery.

The steering column member 11 is arranged within a tubular housing or casing 20 of metal having an inturned end flange 21 which is separated from the conducting ring 17 by a washer 22 of insulating material. The ring 49 of insulating material is disposed between the end of the member 11 and the flange 12 of the member 10, the ring 49 having projections 23 engaging recesses 24 in the end of the member 11 and radial projections 25 engaging corresponding openings 26 in the housing 20. With the parts in this relation, they are held together by a collar 27 embracing the member 10 and engaging the inturned flange 21 of the housing 20. The housing is provided with radial lugs 201 engaging the slot 202 in the steering column member 11, preventing rotation of the switch when the steering post 6 is rotated. The collar 27 is secured in place by a set screw 28 which extends through a bore 29 in the member 10 and engages the steering post 6. The set screw 28 is countersunk in the collar 27 so as not to interfere with the turning of the collar within the steering column.

The steering column member 11 is provided with an internal helical groove 111 extending from one end to the other thereof and seating a contact strip 30 and a contact strip 31 of suitable conducting material, the inner ends 32 and 33 of the helical strip being spaced to provide a neutral zone or station 34 in the groove. The ends 32 and 33 are turned outwardly in slots provided therefor in the member 11 and anchored in place by any suitable means. The helical contact strip 30 is connected to a longitudinal conducting strip 35 which is in turn connected to the right signal 3 by means of a conductor 36. The outer end of the helical contact strip 31 is connected to the left signal 4 by means of conductor 38.

The longitudinal strips 18, 35, and 37 extend through the insulating ring 49 and are held in place by the latter. The conductors 19, 36, and 38 are covered with suitable insulation and extend through a jacketed opening 39 in the steering column 1. While we show the end of the conductors joined to their respective conducting strips by soldered joints, it will be understood that binding posts may be used for this purpose if desired.

In the opposed grooves of the members 10 and 11 we dispose a brush or traveling contactor 40 consisting of a metal block. The brush is adapted to slide in the grooves when the steering post member 10 is rotated within the steering column member. Thus, the brush maintains its contact or coacting relation with one of the helical contacts 30 and 31 depending on the direction of rotation of the steering post. The normal position of the brush is at the neutral station 34 in the helical groove 29, in which position the signals 3 and 4 are not operated.

Now, when, say, a right turn is about to be or is being made, the brush establishes a circuit between the conductor strip 14 and the helical contact strip 30 energizing the right signal 3 by the battery 2, a terminal of the battery being connected to the signals by a common conductor or vehicle ground connector 41. In a similar manner, the left signal 4 is operated when the steering wheel 5 is turned to a certain extent to the left. Thus, when a turn is initiated, the proper signal is operated. After the turn is completed, the brush is returned to the neutral station in the helical groove 29 and the signal circuit is thus automatically opened. In the preferred embodiment of our invention, the brush is in constant sliding contact with the longitudinal strip 14. The strips in the grooves constitute bearings for the brush.

From the foregoing description of our invention, it will be apparent to those skilled in the art that we provide an automatic switch which is simple and compact and economical in its parts. The switch is readily assembled with the steering column of an automotive vehicle and is very effective in operation, the operation being entirely automatic. Modifications will be apparent to those skilled in the art.

Having thus described our invention, what we claim as new and desire to secure by Letters Patent is:

1. The combination with a tubular steering column having a steering post disposed in spaced concentric relation therein, of a direction signal switch disposed within said column and around said steering post and comprising a steering post member of insulating material sleeved on and rotating with said steering post and having an external longitudinal groove extending to one end thereof, a longitudinal strip of conducting material seated in said groove and having a radial end ring embracing said steering post member, a steering column member of insulating material sleeved within said steering column and having an internal helical groove, helical contact strips seated in said helical groove and spaced at their inner ends to provide a central neutral station, a ring of conducting material mounted at one end of said steering column member for constant contact with said end ring embracing said steering post member, means connecting the parts of said switch to provide a self contained unit, and a brush disposed to travel in said longitudinal groove of said post member and engage the helical groove of said column member for establishing an electrical circuit between said longitudinal strip and one of said helical contact strips depending upon the direction of rotation of said steering post member, the normal position of said brush being at said neutral station in said helical groove.

2. The combination with a tubular steering column having a steering post disposed in spaced concentric relation therein, of a direction signal switch disposed within said column and around said steering post and comprising a steering post member of insulating material sleeved on and rotating with said steering post and having an external longitudinal groove, a longitudinal strip of conducting material seated in said groove, a steering column member of insulating material sleeved within said steering column and having an internal helical groove, helical contact strips seated in said helical groove and spaced at their inner ends to provide a central neutral station, means connecting the parts of said switch to provide a self contained unit, and a brush disposed to travel in said longitudinal groove of said post member and engage the helical groove of said column member for establishing an electrical circuit between said longitudinal strip and one of said helical contact strips depending upon the direction of rotation of said steering post member, the normal position of said brush being at said neutral station in said helical groove.

3. The combination with a tubular steering column having a steering post disposed in spaced concentric relation therein, of a direction signal switch disposed within said column and around said steering post and comprising a steering post member rotating with said steering post and having an external longitudinal groove, a non-rotating steering column member within said steering column and having an internal helical groove, a switch member disposed to travel in said longitudinal groove and engaging said helical groove, and contacts for said switch member in said grooves and between which said switch member is adapted to control an electrical circuit in response to the operation of said steering post.

4. The combination with a tubular steering column having a steering post disposed in spaced concentric relation therein, of a direction signal switch disposed within said column and around said steering post and comprising a steering post member on said steering post having an external longitudinal groove, a steering column member within said steering column and having an internal helical groove, helical contacts of conducting material seated in said helical groove and spaced at their inner ends to provide a neutral station, and a brush carried by said steering post member and disposed to engage and be actuated by said helical groove and slide in said longitudinal groove for establishing an electrical circuit with one of said helical contacts depending upon the direction of rotation of said steering post member, the normal position of said brush being at said neutral station.

5. A switch adapted to be associated with the steering column of an automotive vehicle for operation by the steering post thereof and comprising a steering post member having an external longitudinal groove, a brush disposed in said groove for longitudinal sliding movement therein, a steering column member of insulating material having an internal helical groove coacting with said brush and in which said brush travels when said steering post member is rotated, a conducting strip in electrical contact with said brush at all times, and contacts in said helical groove spaced at their inner ends to provide a neutral station for the brush, the rotation of the steering post member to the right advancing said brush into sliding electrical contact with one of said contacts and the rotation of the steering post to the left advancing said brush into sliding electrical contact with the other of said contacts.

6. A switch adapted to be associated with the steering column of an automotive vehicle for operation by the steering post thereof and comprising a rotatable steering post member having a radial brush, a stationary steering column member of insulating material having an internal groove coacting with said brush and in which said brush travels when said steering post member is rotated, a conducting strip in continuous electrical contact with said brush, and contact members in said groove spaced at their inner ends to provide a neutral station for the brush, the rotation of the steering post member to the right advancing said brush into sliding electrical contact with one of said contact members and the rotation of the steering post to the left advancing said brush into sliding electrical contact with the other of said contact members.

7. A switch comprising relatively rotatable cylindrical members arranged in telescopic relation, one of said members having a longitudinal groove and one having a helical groove, the grooves being arranged in opposed relation, a brush simultaneously coacting with said grooves for sliding movement therein when said members are relatively rotated, and conductors in said grooves for contact with said brush, there being a space between the conductors in one of said grooves providing a neutral staion for said brush, said brush being at all times in electrical contact with the conductor in the other groove.

HOLGER H. NIELSEN.
WILLIAM J. KRUDER.